United States Patent
Patel

(10) Patent No.: US 6,415,436 B1
(45) Date of Patent: Jul. 2, 2002

(54) MECHANISM FOR CROSS VALIDATING EMULATED STATES BETWEEN DIFFERENT EMULATION TECHNOLOGIES IN A DYNAMIC COMPILER

(75) Inventor: Amit Patel, Cupertino, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/209,324

(22) Filed: Dec. 11, 1998

(51) Int. Cl.[7] .............................. G06F 9/45; G06F 9/455
(52) U.S. Cl. ....................... 717/140; 717/138; 717/134; 703/26; 703/23; 703/27
(58) Field of Search ............................. 703/23, 26, 28; 717/5, 6, 7, 140, 135, 138

(56) References Cited

U.S. PATENT DOCUMENTS

| | | | | |
|---|---|---|---|---|
| 4,951,195 A | * | 8/1990 | Foggi, Jr. et al. | 703/21 |
| 5,167,023 A | * | 11/1992 | de Nicolas et al. | 703/21 |
| 5,678,032 A | * | 10/1997 | Woods et al. | 395/500 |
| 5,732,210 A | * | 3/1998 | Buzbee | 395/704 |
| 5,732,235 A | * | 3/1998 | Kakle et al. | 395/385 |
| 5,742,802 A | * | 4/1998 | Harler et al. | 395/568 |
| 5,790,778 A | * | 8/1998 | Bush et al. | 395/704 |
| 5,815,720 A | * | 9/1998 | Buzbee | 395/709 |
| 5,835,773 A | * | 11/1998 | Dunn | 395/705 |
| 5,838,978 A | * | 11/1998 | Buzbee | 395/705 |
| 5,848,274 A | * | 12/1998 | Hamby et al. | 395/705 |
| 5,854,928 A | * | 12/1998 | Buzbee | 395/705 |
| 5,857,093 A | * | 1/1999 | Bradford | 395/500 |
| 5,875,318 A | * | 2/1999 | Liangford | 395/707 |
| 5,933,622 A | * | 8/1999 | Buzbee et al. | 395/500 |
| 5,983,012 A | * | 11/1999 | Bianchi et al. | 395/500.44 |
| 6,009,261 A | * | 12/1999 | Sealzi et al. | 395/500.47 |
| 6,021,275 A | * | 2/2000 | Horwat | 395/707 |
| 6,021,469 A | * | 2/2000 | Trembly et al. | 711/125 |
| 6,028,999 A | * | 2/2000 | Pazel | 395/704 |
| 6,031,988 A | * | 2/2000 | Nahashima | 395/500.47 |
| 6,125,439 A | * | 9/2000 | Trembly et al. | 712/202 |
| 6,128,679 A | * | 10/2000 | Beale et al. | 710/62 |

OTHER PUBLICATIONS

"A Complier Approach to Scalable Concurrent Program Design", Foster et al., ACM 1994.*
"Emulation of the occam Parallel programming language", Doherty et al., IEEE 1997.*

* cited by examiner

Primary Examiner—Kevin J. Teska
Assistant Examiner—W. D. Thomson

(57) ABSTRACT

The inventive mechanism compares system states resulting from emulation of the same block of source code by different emulation technologies within a dynamic compiler. A set of initial conditions, parameters of the system state S1, preceding any emulation is stored for later use. Then, the block of source code is emulated by an interpreter generating a system state S2, the parameters of which are contained partly in the system registers and partly in memory locations accessed by the interpreter. The status of the memory locations representing system state S2 are stored in a Write History Stack, while the register values representing system state S2 are saved to a reserved portion of memory. Next, the initial conditions, represented by the parameters of the system state S1, are restored to the appropriate registers and memory location values affected by the interpreter. Then, the same block of code is emulated employing dynamic translation leading to a third system state S3. The parameters of system states S2 and S3 are then compared. If the system states match completely, the mechanism concludes that both emulators operated correctly. If there is a mismatch in any parameter between the two system states, the mechanism concludes that one of the two emulators has a bug. The mechanism then re-emulates the block of code, logging all write operations to registers and memory locations, thereby producing a printed log of emulator activity suitable for analysis by a programmer. The source of the problem can then be readily and rapidly identified by the programmer. The mechanism avoids the time consuming and expensive task of enabling data logging during all emulation activity, by logging data manipulation only for blocks of code which were emulated incorrectly by one of the emulation technologies.

18 Claims, 2 Drawing Sheets

MECHANISM FOR CROSS VALIDATING EMULATED STATES BETWEEN DIFFERENT EMULATION TECHNOLOGIES IN A DYNAMIC COMPILER

TECHNICAL FIELD

The invention relates in general to detecting errors in program emulation and in particular to a mechanism for detecting such errors by comparing emulation results achieved via two independent emulation technologies. Discrepancies between the results point to errors in at least one of the two emulating mechanisms.

BACKGROUND

At least two run-time technologies are available for emulating legacy code. The first is interpretation which emulates one line of code at a time at run-time. At the end of each instruction, the interpreter updates the register mapping associated with the legacy architecture.

A second technology available for emulation is that of Dynamic Translation. Dynamic translation processes legacy code in blocks, where each block is a section of code which does not contain a branching instruction. Translation permits the emulator to examine more than one line of legacy code at a time, and to possibly combine a plurality of lines of code in producing new code so as to maximize the efficiency of the emulation.

The source representation includes the states being emulated such as the registers and the virtual memory, as well as the object code that manipulates them. Existing dynamic compilers use a combination of interpretation to emulate infrequently executed blocks; and dynamic translation to emulate frequently executed blocks. Every visited source block interpreted first and may be translated if it is considered important. A program behaves correctly only when both the interpretation and translation processes work properly.

In order to translate a block, the block must first be interpreted to acquire information on the frequency of execution of instructions within the block. Information gathered through this interpretation is accumulated into a profile. When a block of code has been interpreted a number of times corresponding to a pre-determined threshold, the block is translated and the run-time system subsequently bypasses interpretation and executes the translated code directly.

The interpreter and translator are separate entities, and can independently introduce bugs into program execution. Source code is always interpreted first, and then translated. Therefore, by the time a bug is observed in program execution it is difficult to determine whether it was introduced by the interpreter or the translator. Further, an erroneous result will not be detected until the result is used later on in the program. This gap between the generation of an erroneous result and its detection makes finding the source of the error difficult.

It is possible to enable error data logging while running emulators of different types, and thereby generate printed output listing write operations to register and memory locations. This information can be used by programmers to track down the source of bugs detected in an entire program. However, producing this output for an entire program is expensive and time consuming.

Therefore, it is a problem in the art that there are two independent possible sources for a program error when using a dynamic compiler employing a combination of interpretation and translation.

It is a further problem in the art that an error in a program may be noticed at a point in time, and in the flow of program execution far removed from the point where the error was introduced, making debugging very difficult.

It is a still further problem in the art that enabling register and memory access data logging for an entire program is expensive and time consuming.

SUMMARY OF THE INVENTION

These and other objects, features and technical advantages are achieved by a system and method which emulates the same block of code twice using the two available technologies, interpretation and translation, and comparing the emulation results for that block. Where the emulations match, the mechanism concludes that both emulators have performed correctly. Where the emulations differ, the mechanism presumes that one emulator produced an error in processing the block. Since the code is processed one block at a time, any error will be detected at a block boundary thereby avoiding the problem in the prior art where the error would be detected only when the erroneous result is used.

Where a mismatch is found between the two emulations of basic block, a flag is set enabling error logging in both emulation systems (interpreter and dynamic translator), and the mechanism emulates the same block of code again employing both interpretation and dynamic translation. In this case, no comparison step is conducted. With the error logging flag set, both the interpreter and the dynamic translator generate information during the course of emulating the block relating to register and memory location access. Armed with this information, a programmer can then readily determine which emulator, and in fact, which line of code in the responsible emulator generated the erroneous register entry or memory location entry.

Therefore, it is a technical advantage of the invention that programming bugs are detected at the boundary of the basic block in which the error was caused.

It is a further advantage of the invention that detailed logging of emulation activity by both emulators pertaining to a block of code for which emulation results differed between two emulation systems will permit a programmer to determine which emulation technology is responsible for the error.

It is a still further advantage of the invention that detailed logging of emulation activity including register and memory location access need only be performed when emulation results using two different emulators for a block of code differ, since it is expensive and time consuming to always have error data logging enabled.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
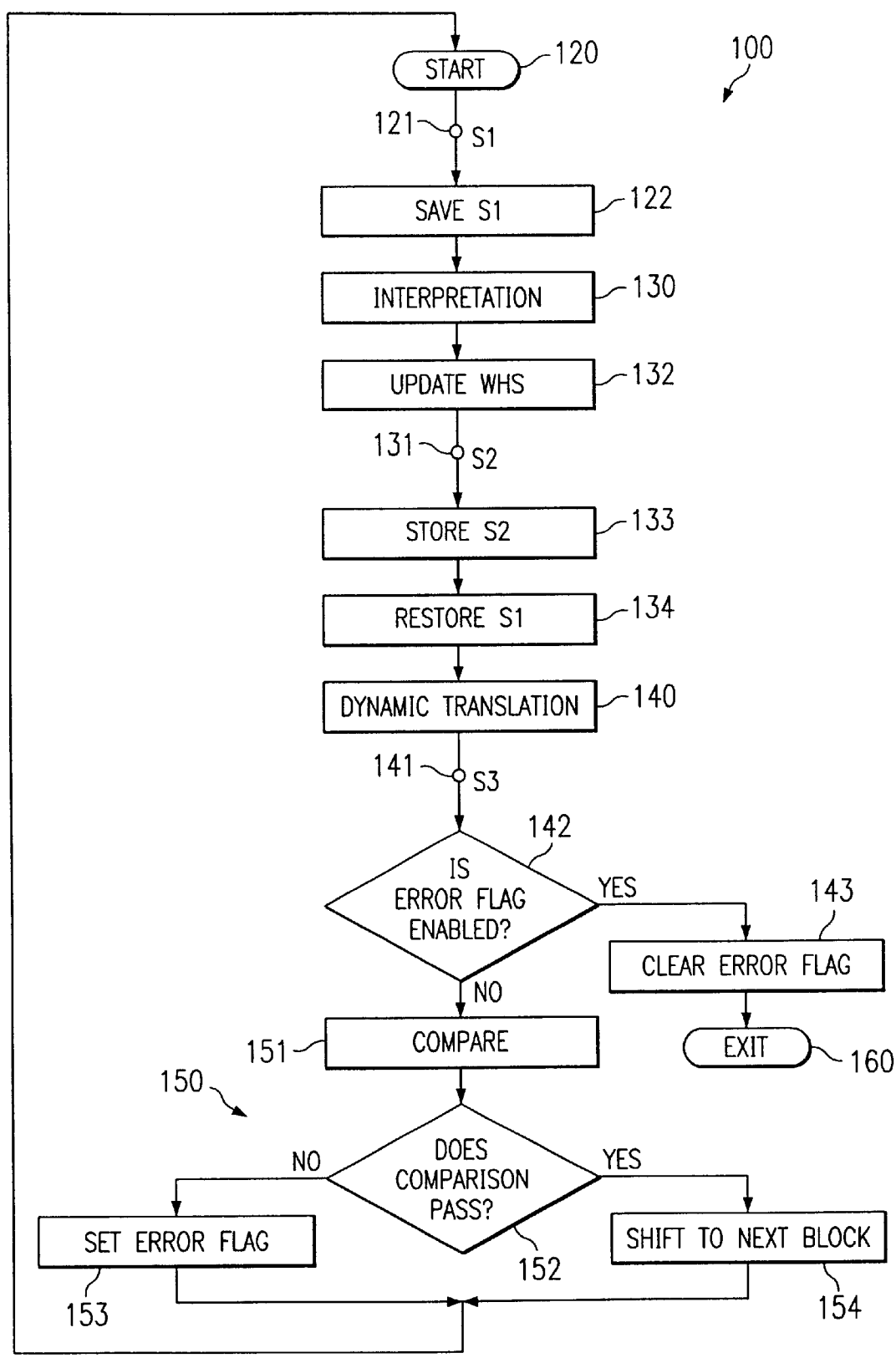
FIG. 1 depicts a mechanism for cross validating system states resulting from two different emulation processes.

FIG. 1 depicts a cross validation procedure 100 between system states arrived at by two different emulation technologies. Cross validation is a three stage process involving, emulation of a block of code by an interpreter 130, emulation of the same block of code via a translator 140, and comparison of the results obtained by these two emulation mechanisms 150.

The program starts at step 120. Before the block of code is executed by any mechanism, the system has an initial state, S1 121, as represented by the values of the system registers and by all the memory locations which will be accessed during operation of the emulators on the block of code concerned. At S1 121, while the identities of the registers is known, the mechanism does not yet know which memory locations will be affected by emulation of the block of code.

The Write History Stack keeps track of the memory portion of the system state, the other portion being preserved by the registers. In the preferred embodiment, each Write History Stack entry contains three fields: the first representing the memory location accessed, the second representing the value in that memory location prior to any particular write operation, and the third representing the value in the same memory location at system state S2. The second field of the first entry in the Write History Stack pertaining to a particular memory location will contain the value of that memory location at system state S1. Second field values for subsequent entries pertaining to the same memory location will contain intermediate values which represent neither the S1 or S2 system state conditions. The last of the three fields is ascertained only upon completion of emulation by the interpreter, while the first two fields are determined during emulation.

For example, if memory location 16 were to be accessed by the interpreter, and had an initial value of 0, this could be determined only once the mechanism determines that the interpreter has accessed memory location 16. The entry in the Write History Stack for this memory location would contain the values 16,0, xxx. The "xxx" in the last sentence represents the fact that the final value is as yet unknown. Continuing with the example, if upon conclusion of emulation by the interpreter, memory location 16 has the value "6" in it, this value will be written into the third field of the pertinent Write History Stack entry when the Write History Stack is updated (step 132) and fields one through three of this entry in the Write History Stack entry would be, respectively, 16, 0, and 6. At state S2, the entries for all memory locations accessed during emulation are complete and resident in the Write History Stack.

At point 121 the system is at state S1. At step 122, the mechanism saves state S1 to memory. Since the memory values to be accessed during interpretation are not yet known, this step saves the register values to a designated area of memory.

In the preferred embodiment, in step 130, the interpreter emulates the block of code. During interpreter emulation 130, the mechanism detects memory write operations. If a write operation is detected, a new entry is created for it on the Write History Stack, thereby establishing the values of the first two of three total fields for that entry, which are, respectively, the memory location itself, and value contained in that memory location immediately prior to the current write operation. This process is repeated for each additional memory write operation conducted during interpretation 130. Therefore, there could be several possible entries in the Write History Stack pertaining to a single memory location.

In an alternative embodiment, there would be only a single entry in the Write History Stack for each memory location accessed during interpretation 130. With such an arrangement, the mechanism would place the initial value present in the memory location at state S1 in the second field of the single Write History Stack entry. This initial value would then be left unchanged throughout the rest the interpretation process 130.

In the preferred embodiment, once interpretation of the block is complete, the mechanism traverses the Write History Stack in step 132, entering the third field of all the entries in the stack. The third field of each entry is established by writing the value, at the time of completion of the interpreter emulation, located in the memory location identified in the first field of each entry, into the third field of the same stack entry. The mechanism does this for all entries in the Write History Stack. Once all entries in the Write History Stack have the third field filled in, information which completely represents the system state S2 can be found in a combination of the Write History Stack which contains the memory portion of the system state, and the registers which contain the balance of the information representing the system state. The system is now at state S2 131.

In an alternative embodiment, information completely representing the system state S2, including both register values, memory locations accessed during interpretation, and the values in these accessed memory locations, could all be saved to a designated portion of computer memory, saved on a non-volatile storage mechanism, or printed on hard copy.

In the preferred embodiment, the Write History Stack is not altered after point 131, and therefore preserves the memory portion of the system state S2. The portion of the system state S2 represented by register values is saved in step 133 by writing the current values of all registers to a reserved section of memory. Therefore, in the preferred embodiment, the totality of information representing the system state S2 is preserved in a combination of the Write History Stack, which contains the memory access and content portion of the system state, and in the portion of memory to which the register values active at system state S2 were saved.

Prior to emulating the block of code using the dynamic translator, the system must be brought back to its initial condition, system state S1 121, by performing step 134, in order for an accurate comparison to be conducted between the two emulators. Accordingly, the values of the registers are restored to their initial values by reading system state S1 register values from the memory locations in which these register values were stored in step 122, and writing these values to the appropriate registers. The memory locations altered during interpretation of the block of code are restored to their system state S1 values by traversing the Write History Stack in last-in-first-out (LIFO) order and writing the value of the second field of each entry to the memory address or location stored in the first field of each entry. This process is repeated for each entry in the Write History Stack thereby restoring the values of memory locations affected by the interpretation process 130 to their System state S1 values.

Where several entries on the Write History Stack pertain to a single memory address, that address will be written to several times during this restoration process 134. The last Write History Stack entry associated with a particular memory address to be accessed in LIFO order during step 134 will contain the value resident in the pertinent memory location at system state S1, the initial condition. This system state S1 value will accordingly be the last value written to the memory address, and the mechanism will thus accurately restore the contents of memory address concerned to its initial value.

During the dynamic translation process, step 140, the mechanism may or may not be presented with code native to the processor being used. If the code is native, the dynamic translator executes the code. If the code is not native, the dynamic translator translates the code first, and then executes it. In the following, the term "emulation" can refer to either operation.

Step 140 begins with the registers and memory locations containing the values representing system state S1. In step 140, the Dynamic translator proceeds to emulate the block of code interpreted in step 130. The dynamic translator accesses the same memory locations during its emulation of the block of code as did the interpreter. In the preferred embodiment, the dynamic translation 140 does not access the Write History Stack. Instead, the register values and the various memory location contents affected by emulation of the block are permitted to change throughout step 140 without separate recording of the values of register and memory location contents.

At the conclusion of dynamic translation 140, system state S3 141 is reached, S3 representing the results of dynamic translation as stored in the registers and the memory locations accessed during emulation.

At decision block 142, the mechanism determines whether or not the error flag, which can be set in step 153, is set or not. If the flag is set, then no comparison is performed. In this case, the mechanism then clears the error flag in step 143, and the program terminates at step 160. If the flag is not set, the mechanism proceeds to compare system states S2 and S3 in step 151.

In the preferred embodiment, the comparison of the two states 151 proceeds by comparing the current values of the registers which are already in their S3 141 state, with the values present in the registers at system state S2 131. The values of the registers at state S2 were saved to a reserved section of memory, so performing the comparison requires comparing the values stored in these known memory locations with the current, state S3, register values.

As of step 151, the memory locations affected by emulation of the block contain the values representing their condition at system state S3 141. Performing the comparison requires comparing the values in these memory locations with the memory location values stored in the Write History Stack, which still contains information about system state S2. The mechanism traverses the Write History stack and, for each entry therein, compares the current value of the memory location identified in the first field with the stored system state S2 value stored in the third field of the entry. This process is repeated for every entry in the Write History Stack.

In alternative embodiments, the values for both register and memory location contents could both be stored in reserved sections of memory, or non-volatile storage, or both be stored in separate Write History Stacks.

At step 152, the mechanism branches differently depending upon whether the comparison passed or failed. In order for the comparison 151 to pass, all register and memory location values for system states S2 and S3 must match. Any discrepancy causes a failure condition to result. If the comparison passes, the mechanism shifts to the next block of code in step 154 and starts execution again at start position 120.

If the comparison fails, the mechanism sets an error flag in step 153 and turns on a data logging function. The mechanism proceeds to repeat emulation of the same block of code by both emulators, with data logging enabled, thereby producing detailed information in either electronic, or printed form, or both, about the register and memory location access activity of both emulators.

Step 153, in addition to enabling data logging, sets a flag which is later checked in step 142 in order to avoid unnecessarily performing the comparison step a second time for the same block of code. At the conclusion of logged emulation of the block of code by both emulators, printed output may be obtained providing ample information with which to track down the source of the error.

Once printed output or some other form of record of emulator activity is complete, a programmer can readily determine which emulator is responsible for the discrepancy detected in step 151. Further, the data is sufficient to permit the programmer to identify which individual program step performed the register or memory location write operation which generated the incorrect value(s).

Figure 2:
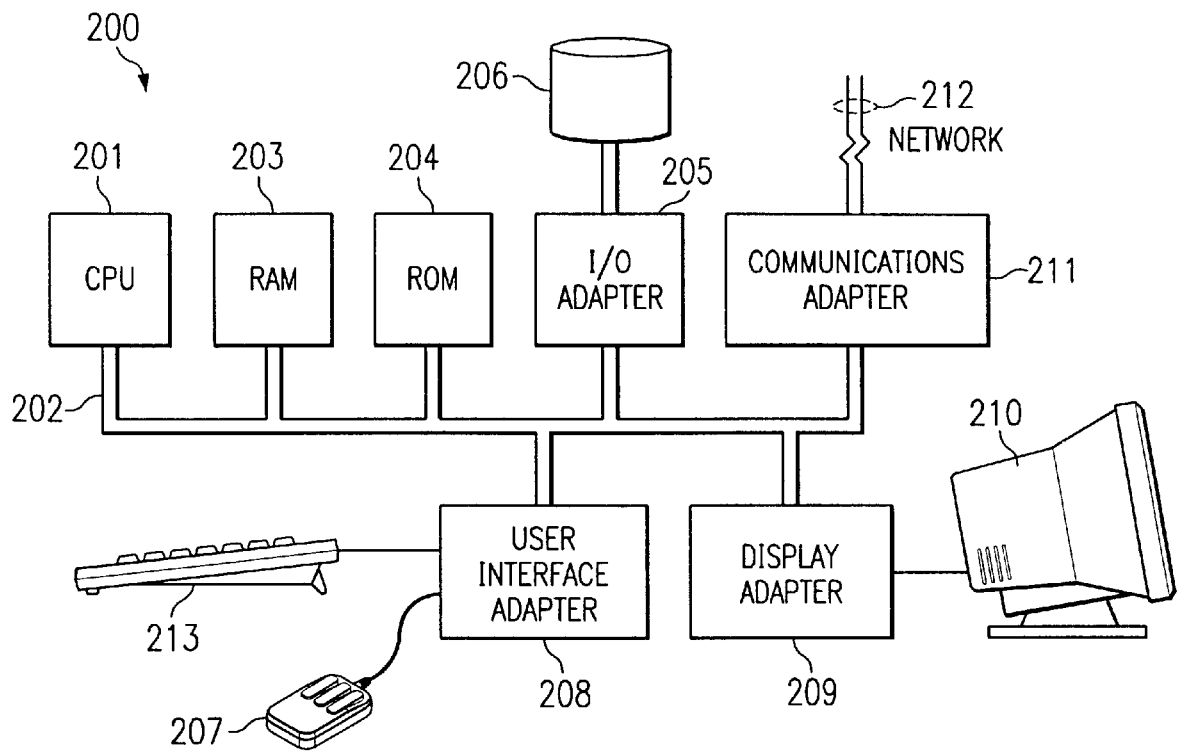
FIG. 2 depicts a computer system adapted to use the present invention.

FIG. 2 depicts a computer system 200 adapted to use the present invention. Central processing unit (CPU) 201 is coupled to bus 202. In addition, bus 202 is coupled to random access memory (RAM) 203, read only memory (ROM) 204, input/output (I/O) adapter 205, communications adapter 211, user interface adapter 208, and display adapter 209.

RAM 203 and ROM 204 hold user and system data and programs as is well known in the art. I/O adapter 205 connects storage devices, such as hard drive 206 or CD ROM (not shown), to the computer system. Communications adapter 211 couples the computer system to a local, wide-area, or Internet network 212. User interface adapter 208 couples user input devices, such as keyboard 213 and pointing device 207, to the computer system 200. Finally, display adapter 209 is driven by CPU 201 to control the display on display device 210. CPU 201 may be any general purpose CPU, such as a HP PA-8200. However, the present invention is not restricted by the architecture of CPU 201 as long as CPU 201 supports the inventive operations as described herein.

Although the present invention and its advantages have been described in detail, it should be understood that various changes, substitutions and alterations can be made herein without departing from the spirit and scope of the invention as defined by the appended claims.

Figure 3:
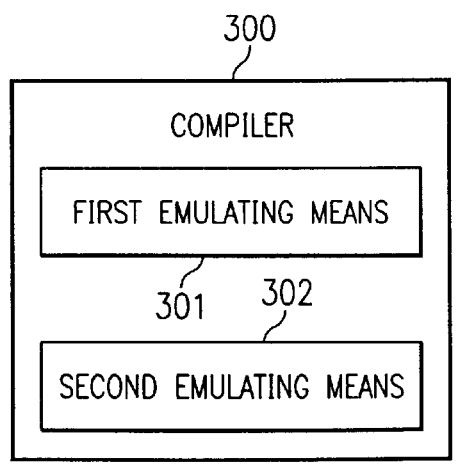
FIG. 3 depicts a compiler having first and second emulation means operating therein.

FIG. 3 depicts compiler 300 having first emulation means 301 and second emulation means 302 operating therein.

What is claimed is:

1. A method for comparing emulated states between different emulation technologies for each block of code in a source program run on a computing system, the method comprising the steps of:

(a) emulating a block of source code employing a first emulating means, thereby creating a first emulated state, wherein the computing system has initial conditions prior to step (a);

(b) emulating the block of code employing a second emulating means that is different from the first emulating means, thereby creating a second emulated state;

(c) comparing the first and second emulated states; and (d) wherein the method operates in a dynamic compiler.

2. The method of claim 1, wherein the first emulating means is interpretation and the second emulating means is dynamic translation.

3. The method of claim 1, wherein the initial conditions are stored prior to said step (a).

4. The method of claim 1, wherein the first emulated state is stored before any data relating to said first emulated state is modified.

5. The method of claim 4, wherein the initial conditions are restored after said step of storing said first emulated state, and prior to said step of emulating employing dynamic translation.

6. The method of claim 4, comprising the further steps of:

(d) generating a passing condition if the first and second emulated states are found to be identical in the step of comparing; and (e) generating a failing condition if the passing condition is not generated by step (d).

7. The method of claim 6, wherein the step of comparing results in the failing condition, the method further comprising the steps of:

enabling data logging; and emulating the block of code with interpretation and dynamic translation, thereby producing data logged information.

8. The method of 4, wherein a portion of the first emulated state is stored in a Write History Stack.

9. A system for comparing emulated states between different emulation technologies for each block of code in a source program run on a computing system, the system comprising:

means for emulating a block of source code employing a first emulating means, thereby creating a first emulated state, wherein the computing system has initial conditions prior to employing said first emulating means;

means for emulating the block of code employing a second emulating means that is different from the first emulating means, thereby creating-a second emulated state;

means for comparing the first and second emulated states; and wherein the system operates in a dynamic compiler.

10. The system of claim 9, wherein the first emulating means is interpretation and the second emulating means is dynamic translation.

11. The system of claim 9, further comprising means for storing the initial conditions before any data relating to said initial conditions is modified.

12. The system of claim 9, further comprising means for storing the first emulated state before any data relating to said first emulated state is modified.

13. The system of claim 12, further comprising means for restoring said initial conditions after the first emulated state is stored, and prior to emulating employing dynamic translation.

14. The system of claim 12, comprising:

means for generating a passing condition if the first and second emulated states are found to be identical by the means for comparing; and means for generating a failing condition if the passing condition is not generated by the means for generating a passing condition.

15. The system of claim 14, wherein the means for comparing results in the failing condition, the system further comprising:

means for enabling data logging; and means for emulating the block of code with interpretation and dynamic translation, thereby producing data logged information.

16. The system of claim 12, wherein a portion of the first emulated state is stored in a Write History Stack.

17. A computer program product having a computer readable medium having computer program logic recorded thereon, operable on a computer for comparing emulated states between different emulation technologies for each block of code in a source program run on a computing system, the computer program product comprising:

means for emulating a block of source code employing a first emulating means, thereby creating a first emulated state, wherein the computing system has initial conditions prior to employing said first emulating means;

means for emulating the block of code employing a second emulating means that is different from the first emulating means, thereby creating a second emulated state;

means for comparing the first and second emulated states; and wherein the system operates in a dynamic compiler.

18. The computer program product of claim 17, wherein the first means for emulating is an interpreter, and the second means of emulating is a dynamic translator.

* * * * *